March 14, 1933.  A. H. CIPULLO  1,901,551
CLOSURE
Filed July 18, 1929
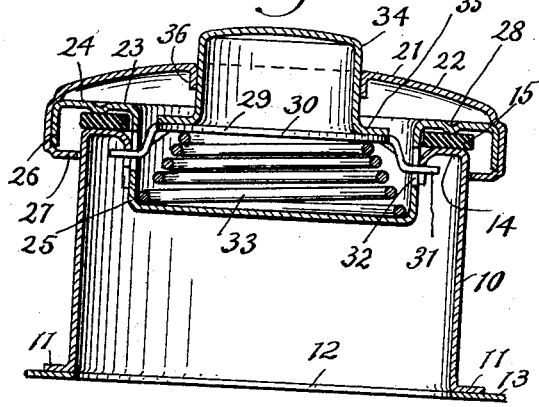
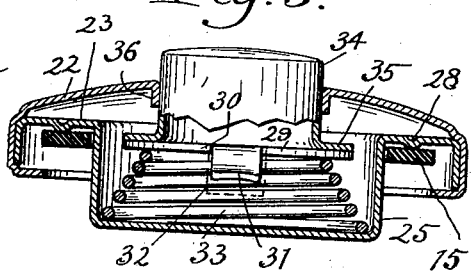
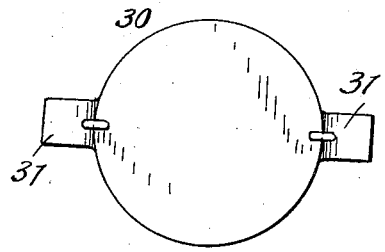
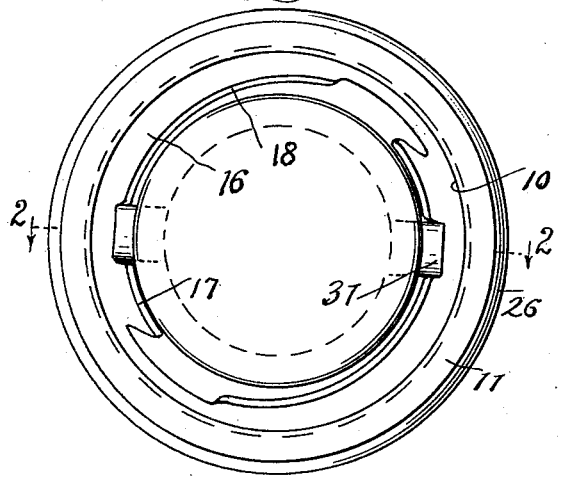
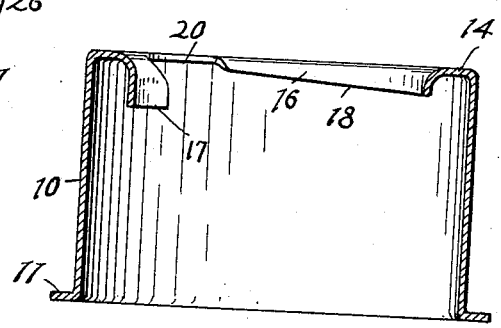
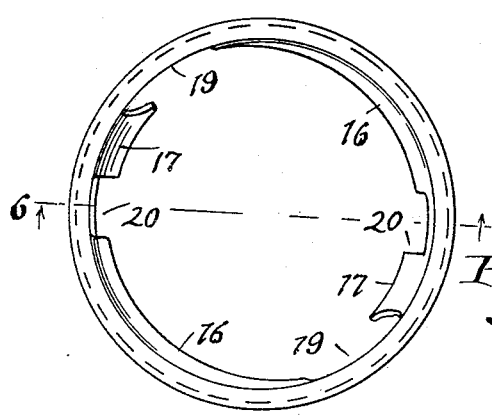
Inventor
Anthony H. Cipullo
Kiros Hudson & Kent
Attys.

Patented Mar. 14, 1933

1,901,551

UNITED STATES PATENT OFFICE

ANTHONY H. CIPULLO, OF CLEVELAND, OHIO, ASSIGNOR TO EATON MANUFACTURING COMPANY, OF CLEVELAND, OHIO, A CORPORATION OF OHIO

CLOSURE

Application filed July 18, 1929. Serial No. 379,222.

This invention relates to closure devices, and more particularly to an improved form of cap or closure member of the bayonet type adapted to be used in connection with a tubular member, such as the filler neck of an automobile radiator, gas tank, or the like.

An object of this invention is to provide an improved form of closure device in which automatic means is provided for securely locking the closure member against disengagement from the tubular member.

Another object of this invention is to provide an improved form of closure device having means accessible from the exterior of the closure member for releasing the locking means which holds the closure member and the tubular member against disengagement.

The invention may be further briefly summarized as consisting in certain novel combinations and arrangements of parts hereinafter described and set out in the appended claims.

In the sheet of drawings forming a part of this application,

Fig. 1 is a bottom plan view showing the closure member in locked position on the tubular member;

Fig. 2 is a section taken on line 2—2 of Fig. 1;

Fig. 3 is a side elevation showing the closure member of my device with parts thereof in section;

Fig. 4 is a detached plan view of the locking member;

Fig. 5 is a top plan view of the tubular member; and

Fig. 6 is a section taken on line 6—6 of Fig. 5.

The closure device of my invention comprises a tubular member, such as a container filler neck, and a cap or closure member of the quick detachable bayonet type adapted to be applied to the tubular member to close the opening therein. The closure member is provided with a locking device which automatically locks the closure member to the filler neck when the closure member has been applied to the neck and rotated thereon. This locking device prevents accidental separation of the members, and is provided with means which is accessible from the exterior of the closure member for causing disengagement of the locking device to permit the closure to be removed from the filler neck.

As shown in the drawing, the tubular member may consist of a container filler neck 10 provided at its inner end with a flange 11 which surrounds an opening 12 through the wall of the container 13, and is securely connected to the container in any convenient manner. The outer end of this filler neck is provided with a laterally extending annular flange 14 which serves as a suitable seat for the gasket 15. Portions of the annular flange 14 are turned inwardly to form the depending flanges 16 and the depending lugs 17. The inner edges of the depending flanges 16 are shaped to provide inclined cam surfaces 18 with which portions of the locking device of the closure member cooperate. Opposed openings 19 are formed through the annular flange 14 at one end of the cam surfaces 18 to admit the portions of the locking device which cooperate with these surfaces, while at the opposite ends of these cam surfaces I provide opposed locking recesses 20. When the closure member is applied to the filler neck, portions of the locking device enter the openings 19, and, upon rotation of the closure member relative to the filler neck, these portions follow or ride along upon the cam surfaces 18 until they engage in the locking recesses 20. The engagement of these portions in the locking recesses 20 securely locks the closure member against rotation in either direction relative to the filler neck and thus prevents accidental engagement of these members.

The cap or closure member itself comprises a body portion 21 which is composed of an outer shell or part 22 and an inner shell or part 23. The inner part is formed with a laterally extending annular portion 24 having a depending cup-shaped central portion 25 and a depending peripheral flange 26. This inner part is assembled in the outer part and is permanently retained therein by bending a portion of the outer part around the depending peripheral flange 26 of the inner part. The portion of the outer part which is bent around this depending flange of the inner part terminates in a laterally extending annular flange 27 which loosely surrounds the filler neck when the closure member is applied thereon. The depending central portion 25 of the inner member fits loosely in the filler neck opening, and, with the annular flange 27 of the outer part, serves to accurately locate the closure member upon the filler neck and to prevent lateral movement between these members when the closure member has been locked in position. The annular portion 24 of the inner part is provided with a continuous annular bead 28 which bears against one side of the gasket 15 when the closure member is applied to the filler neck, and presses the gasket into sealing engagement with the annular flange 14.

For retaining the cap or closure member upon the filler neck, I provide a locking member which, in this instance, has a body portion 30 disposed within the cup-shaped central portion 25 of the inner part, and is provided with locking fingers 31 which extend laterally through openings 32 formed in the side wall of the depending portion. When the closure member is applied to the filler neck, the locking fingers 31 enter the opposed openings 19, and upon rotation of the closure member, these fingers follow the cam surfaces 18 and engage in the locking recesses 20. For normally urging the locking member and the fingers thereon toward locking position, I provide a compression spring 33, which is arranged in the depending portion of the inner part, with one end bearing against the bottom wall of this depending portion and its opposite end bearing against the body portion of the locking member. The spring 33 yieldingly holds the fingers 31 against the cam surfaces 18 and presses these fingers into engagement with the locking recesses 20 when the closure member is rotated upon the filler neck. This action of the spring insures an efficient seal between the gasket 18 and the members of the closure device, and, in addition, retains the fingers of the locking device in the locking recesses, so that the closure member cannot be rotated upon the filler neck until these fingers have been retracted from the locking recesses.

For the purpose of retracting the locking fingers from the locking recesses to permit removal of the closure member from the filler neck, I provide a movable member 34 which is accessible from the exterior of the closure member. This movable member may be constructed in various forms, but in this instance I show such a member constructed in the form of a button which is preferably provided at one end with an annular flange 35. The button is arranged with its flange 35 bearing against the body portion of the locking member, and with its opposite end extending through the wall of the top part 22. A portion of the metal of the top part is turned inwardly to form a depending flange 36, which surrounds the opening through which the button extends, so as to form a bearing for guiding the movements of the button.

After the closure member has been applied to the tubular member and rotated thereon, the locking fingers are in engagement with the locking recesses 20. When the closure member is to be removed from the filler neck, the button 34 is pressed inwardly to move the locking member 29 against the action of the spring 33 and thereby retract the fingers from the locking recesses. While the button is depressed, the locking fingers are out of engagement with the locking recesses, thus releasing the closure member so that it may be rotated on the filler neck and disconnected therefrom.

It will now be readily understood that I have provided a closure member having an efficient form of locking device which automatically locks the closure member to the filler neck in such a manner as to insure an efficient seal between these parts, and also securely retains these parts against accidental separation which would result in the loss of the closure member and in the loss of the fluid in the container.

While I have shown and described the device of my invention in a detailed manner, it should be understood that I do not limit myself to the precise details and arrangements shown and described, but regard my invention as including such changes and modifications as do not involve a departure from the spirit of the invention and the scope of the appended claims.

Having thus described my invention, I claim:

1. A closure for a tubular member comprising a hollow closure body, a locking member in said hollow closure body and rotatable therewith, said locking member having portions adapted to engage in locking recesses provided in said tubular member for retaining the closure thereon, means in said hollow closure body for yieldingly pressing said portions into said recesses, and means accessible from the exterior of the closure body for moving said portions out of said locking recesses against the action of said yielding means.

2. A closure for a tubular member comprising outer and inner parts held in assembled relation to form a hollow closure body, a locking member in said hollow closure body and rotatable therewith, said locking member having portions adapted to engage locking means provided on said tubular member for retaining the closure thereon, means in said hollow body for yieldingly pressing said portions so as to engage said locking means, and means extending through the wall of said outer part for moving said portions out of engagement with said locking means against the action of said yielding means.

3. A closure for the opening of a tubular member comprising an outer part and an inner part held in assembled relation to form a closure body, said inner part having a depending hollow portion, a locking member in said hollow portion and having fingers adapted to engage in locking recesses provided in the tubular member, a spring in said hollow portion for yieldingly pressing said fingers into said recesses, and a movable button-like member extending through and guided in the wall of said outer part for moving said fingers out of said recesses against the action of said spring.

4. A closure of the character described comprising a hollow cap body having an opening in the top thereof, a bayonet locking member having a plate portion movably disposed in said hollow body, a spring engaging one side of the plate portion of said locking member for yieldingly resisting movement of said member in one direction, and a button engaging the other side of the plate portion of said locking member and extending through said opening for moving said locking member in opposition to said spring.

5. A closure of the character described comprising a cap body having a hollow depending extension on the under side thereof and an opening in the top of the cap body communicating with said hollow extension, a bayonet locking member having a plate portion movably disposed in said hollow extension, a spring in said extension engaging the under side of said plate portion, and a button engaging the opposite side of said plate portion and extending through said opening for moving said locking member in opposition to said spring.

In testimony whereof, I hereunto affix my signature.

ANTHONY H. CIPULLO.